United States Patent Office 3,444,959
Patented May 20, 1969

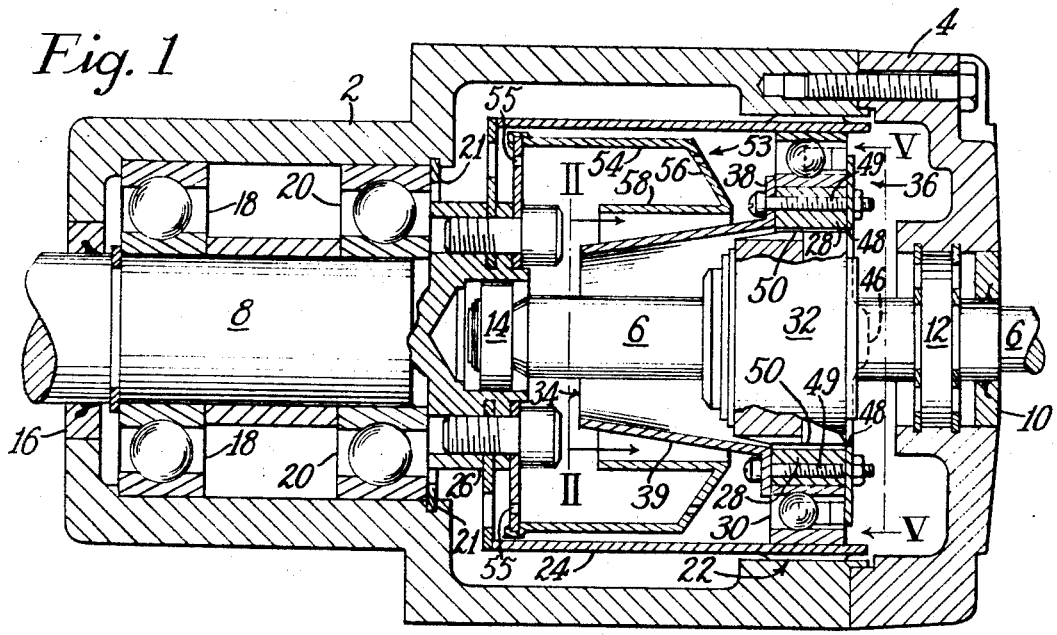

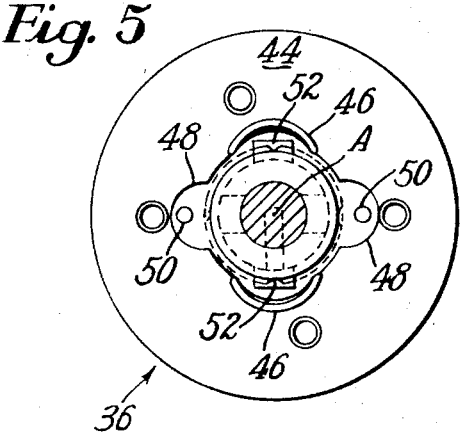
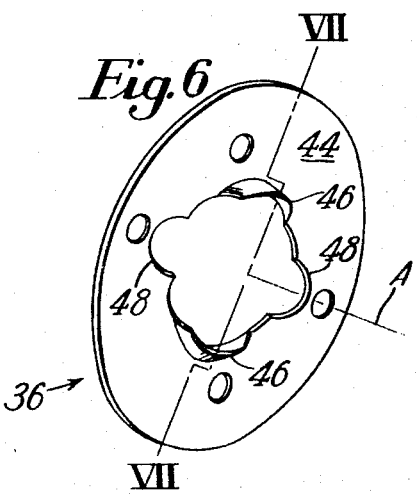
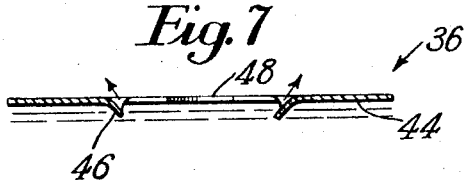
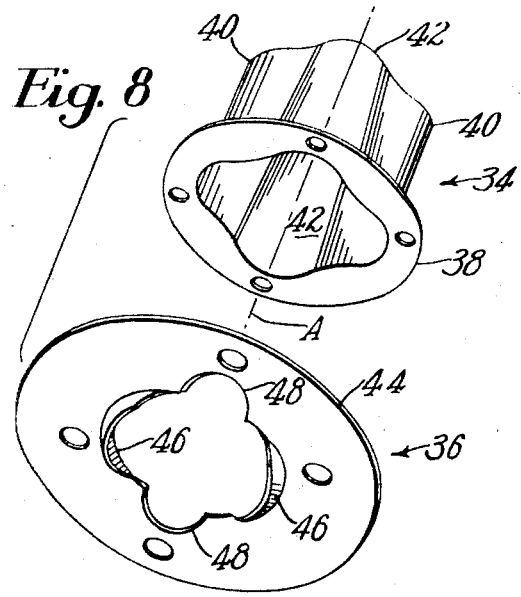
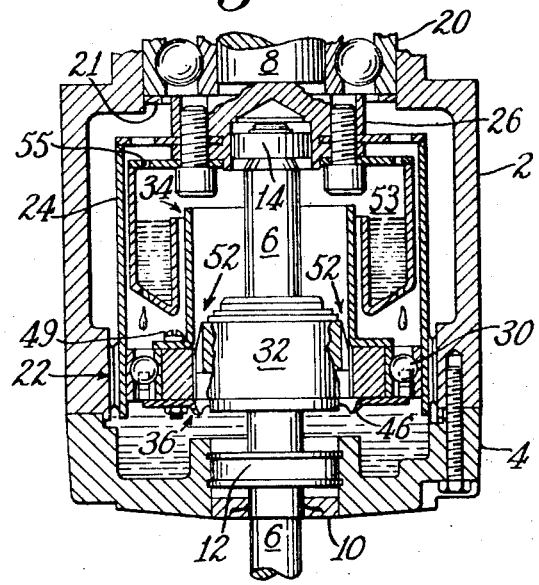

3,444,959
LUBRICATION PUMPING SYSTEM
Donald L. Mansfield, South Hamilton, and Peter C. Tappan, Beverly, Mass., assignors to U.S.M. Corporation, Boston, Mass., a corporation of New Jersey
Filed Aug. 1, 1966, Ser. No. 569,414
Int. Cl. F16n *7/36;* F01m *1/00;* F04b *19/00*
U.S. Cl. 184—6
8 Claims

ABSTRACT OF THE DISCLOSURE

An all-attitude lubrication system for use in a mechanism within a sealed chamber comprising a rotatable shaft within a chamber and at least two pump elements mounted upon the shaft enabling lubricant stored within the chamber to be pumped axially on said shaft independently of the attitude of the mechanism. The pumps are designed so that the pumping section of one of the pumps will be directly opposite a nonopposing section of the adjacent pump.

---

This invention relates to speed and torque transmission and reduction devices and is directed more particularly to lubrication means for such devices. The invention is herein illustrated in connection with transmission means of the type disclosed in United States Patent No. 2,906,143, granted on Sept. 29, 1959 to C. Walton Musser and known as "Harmonic Drive." It will be understood that the invention might be employed in connection with other machines.

A recurring need in the utiliaztion of the harmonic drive transmisison means described in the above-mentioned patent is that of providing proper cooling and lubrication to the bearings in the many attitudes in which the transmission may be positioned for use, thereby preventing material failure, maintaining high efficiency, and minimum temperature rise.

It is well recognized that where there are adjacent machine components moving relative to each other, such movement creates friction which is evidenced by a marked increase in the temperature of the components. To assure relatively efficient service from the mechanism, it is desirable to keep both friction and heat to a minimum.

It is axiomatic that the provision of lubricating material between the moving parts of a mechanism minimizes the contact between these parts, thereby lessening the friction generated.

A means for providing lubrication to all parts of a mechanism irrespective of the attitude or orientation is to seal the elements needing lubrication within a chamber and to fill the entire void surrounding the elements with a lubricant. This method of lubrication is perfectly adequate if the elements do not turn at a very rapid rate and so do not generate a great deal of heat due to churning of the lubricant. However, where the mechanism operates at high speed, or for any other reason generates heat at a rapid rate, dissipation of the heat so generated becomes a troublesome problem.

The designer of high speed mechanisms must take into account the requirement that there be sufficient lubricant to remove generated heat and carry same to locations where it can be dissipated as well as lubricating the sliding and rolling contacts. In addition the amount of lubricant, subjected to high speed viscous shear and thus further generation of heat, must be kept to a minimum. A further design problem which must carefully be considered is the provision of a sufficient volume of lubricant to allow extended operation of the mechanism without maintenance.

To enable the mechanism to operate with sufficient lubrication and yet satisfy the corresponding requirements it is necessary to provide lubricant storage distal from the relatively moving parts and a means to move the lubricant to the critical areas.

Therefore, one of the objects of this invention is to provide a lubricating system which is simple, reliable and efficient.

It is still a further object of this invention to provide a lubricating device which operates efficiently in any attitude or orientation.

Commonly used lubrication systems incorporate one or more pumps intimately associated with a turning axis or turning axes. A problem which exists when using this type of mechanism is that the amount of lubrication provided to a critical area will depend directly upon the speed of the pump; a great deal of lubricant is supplied when the pump is rotating at a high speed and less lubricant is provided when said pump is rotating at a slower speed.

Accordingly, a further object of this invention is to provide as an integral part of the lubricating mechanism a metering device which will maintain lubrication to selected parts at a predetermined constant rate.

A still further object of this invention is to provide storage for lubricant which does not cause said lubricant to be subjected to excessive viscous shear and yet does not increase the overall size of the mechanism.

With the above and other objects in view, as will hereinafter appear, the present invention in one aspect thereof contemplates the provision of a centrifugal pump having conical pump elements opposingly mounted on a single rotating shaft within a confined area. The pump elements are of such a configuration and mounted in such a manner that one cooperates with the other to provide an adequate supply of lubricant to critcial portions when the transmission device is operated in other than a substantially horizontal position.

In accordance with a further feature of the invention there is incorporated a simple regulating means which assures a steady and consistent flow of lubricant to critical parts, overriding and leveling off variations in amount provided by the pump mechanism.

There is also provided a lubricant storage means which does not increase the bulk of the overall mechanism and yet removes the stored lubricant from relatively moving parts.

The above and other features of the invention including various novel details of construction and combinations of parts will now be more particularly described with reference to the accompanying drawings and pointed out in the claims.

In the drawings:

FIG. 1 is a view partially in section of the illustrative speed reduction device including a lubricating pump and a lubrication metering system;

FIG. 2 is a view of one of the two pump elements taken along line II—II of FIG. 1;

FIG. 3 is a perspective view of the pump element shown in FIG. 2;

FIG. 4 is a sectional view of the pump element of FIG. 3 taken along line IV—IV;

FIG. 5 is a view of the other pump element taken along line V—V of FIG. 1;

FIG. 6 is a perspective view of the pump element of FIG. 5;

FIG. 7 is a sectional view along line VII—VII of FIG. 6;

FIG. 8 is a perspective view of the two pump elements showing their relative orientation; and FIG. 9 is a view partially in section of the lubricating portion of FIG. 1 when in a vertical position.

The invention is illustrated as embodied in a mechanism which may be used as a speed increaser or as a speed reducer, depending upon which end is used as an input.

As can be seen in FIG. 1, the mechanism comprises a sealed unit including as an integral portion a sealed chamber defined by a casing made of two cup-like elements 2 and 4 bolted together. Extending through the base portions of the cup-like elements defining the sealed chamber are two separate rotatable shafts 6 and 8, one an input, the other an output. For simplicity shaft 6 will be referred to as the input. A speed and torque converting device to be described in more detail links the two shafts. The input shaft 6 is suitably sealed by a seal 10 at its entry into the chamber, preventing escape of lubricant. The shaft 6 rotates about a fixed axis defined by bearings 12 and 14. The output shaft 8, likewise suitably sealed by a seal 16, is journaled in pre-lubricated bearings 18 and 20.

For convenience a general description will now be given of the particular torque converting device used to illustrate the lubricating system, but the reader is referred to the aforementioned patent granted to Musser for a more detailed description of this mechanism. The illustrative torque convertive mechanism comprises a stationary ring gear 22 which in the illustrative embodiment is integral with the casing 2 and has teeth formed on the inner portion of said gear. This ring gear is denoted generally as a circular spline. Mounted in meshing contact with the circular spline 22 is a cup-shaped flexspline 24 having external teeth engageable with the teeth of the circular spline 22 but fewer in number. The base of the flexspline 24 is rigidly bolted to an outwardly extending hub 26 of the output shaft 8. Mounted within the circle defined by the teeth of the circular spline and the flexspline and generally in the same plane is an elliptoid cam or wave generator 28. The wave generator 28 is fixed to and rotated by shaft 6 and transfers its elliptoid shape to the flexspline through the bearings 30. The rotation of the wave generator causes an advancing in wave motion and thus a rotational movement of the flexspline 24 within the circular spline 22.

Thus, upon rotation of the shaft 6, the wave generator 28 acts upon the flexspline 24 to cause progressive engagement of its teeth with those of the circular spline 22, causing rotational movement of the flexspline 24, and thus the output shaft 8, at a speed relative to that of the shaft 6, dependent upon the number and the difference in the number of teeth of the two splines.

The fact that the shaft 6 is journaled in three separate bearings 12, 14 and 28 presents manufacturing problems. To manufacture the parts with such accuracy that the shaft will be aligned with its bearings without causing excessive wear on any of said bearings would be prohibitively expensive. In the illustrative machine this area of expense is greatly reduced by the use of a flexible coupling 32 adjacent the bearing 30. The particular coupling means used is not critical to this invention and therefore is not shown or described.

When the illustrative mechanism is in the position shown in FIG. 1, i.e., the shafts 6 and 8 rotating about a horizontal axis, no auxiliary lubricating device is necessary. The rotation of the elements of the mechanism when the shafts are substantially horizontally disposed will cause a splashing of the lubricant provided, thus adequately lubricating all of the parts within the chamber surrounding input shaft 6.

It is when the apparatus is in an attitude or orientation in which the shafts 6 and 8 are vertically disposed or in any position other than substantially horizontal that lubrication of the bearings and associated mechanism presents a problem. The difficulty of lubrication when the apparatus is in these positions is alleviated by the provision of a pump comprising coaxially mounted, oppositely faced centrifugal pump elements of mechanisms 34 and 36, which can be seen in plan view in FIGS. 2 and 5, respectively, and perspectively in FIGS. 3 and 6, respectively, which pump is the subject of this invention.

These pump elements will, depending upon the orientation of the mechanism, force lubricant to those parts which normally have no contact with lubricant within the chamber.

Referring to FIGS. 2 and 3, the pump mechanism 34 has a flat base portion 38 having a circular outer perimeter and an irregularly shaped central aperture. Upstanding from said base portion and as an integral part thereof is a sleeve 39 which is the pumping element itself and is of fluted cross section symmetrical about an axis normal to the base portion 38. The sleeve portion is of a fluted construction when viewed from the interor in which the opposed flutes 40 are normal to the base and the flutes 42 taper inwardly or toward its central axis of rotation A. The particular shape of the pumping element 34 is important both from a manufacturing standpoint and an operational standpoint. The shape of pump element 34 permits it to be easily and economically manufactured but, more importantly, the shape of the element causes it to cooperate with pump element 36 in operation, a cooperation which will be described in greater detail.

The pumping element 36, see FIGS. 5 and 6, comprises a base portion 44 and two upstanding inwardly tapered lips 46. The shape of this element is likewise important to the overall lubricating system cooperating with the shape of pump element 34.

It is the physical phenomenon that a hollow truncated conical body, when whirled with the smallest end immersed in a liquid, will cause the liquid to climb up the inside of the tapered sides that makes the present invention possible. Similarly, but with less efficiency and requiring generally a higher rotation speed, a hollow cylinder or a body having holes bored therein, either parallel to or inclined away from the axis of rotation, will pump liquid upwardly when the lowermost end is immersed in the liquid and rotated.

In operation, when the rotating pump element 34 has the end of the sleeve with the smallest cross section extending beneath the surface of the lubricating liquid, the tapered portions 42 will cause said element to act as a centrifugal pump forcing the liquid up the tapered sides of the pump in the direction of the arrows (see FIG. 4) toward the flange 38 of said pump element. Similarly, when the inwardly tapered lips 46 of the pump element 36 extend beneath the surface of the liquid, they will force the liquid upwardly in the direction of the arrows (see FIG. 7).

Referring now to FIG. 8, there can be seen the two pump elements 34 and 36 in an exploded view showing the relative positions of the tapered or conical portions. Some parts of the mechanism have been removed for clarity. It is to be noted that the tapered portion 42 of pump element 34 will be aligned with or overlie a cutout portion 48 of pump element 36, allowing any liquid forced by pump element 34 to freely pass therethrough. It is further to be noted that the tapered flanges 46 of pump element 36 will be in alignment with the portions 40 of pump element 34 which are normal to the base, allowing any liquid impelled by the flanged lips to pass.

Pump elements 34, 36 are secured by bolts 49 (FIGS. 1 and 9) on opposite sides of the elliptoid cam or wave generator 28 in the relative position shown in FIG. 8. Passing through the elliptoid cam are two pairs of bores 50 and 52. The bores 50, as can be seen in FIG. 5, are aligned with the cutout portions 48 of pump 36 as well as with the tapered portion 42 of pump element 34. This alignment of the tapered portion 42, bore 50 and the cutout portion 48 allows the liquid impelled by the pump element 34 to pass through the elliptoid cam and to travel beyond the pump element 36.

Likewise, the alignment of the tapered lips 46 of the pump 36, with the bores 52 through the elliptoid cam and with the normal flutes 40 of pump element 34 allow the passage of liquid impelled by the pump 36 through the elliptoid cam and beyond the pump element 34.

When the shaft 8 is lowermost, the seal 16 will form the bottom member of the cavity containing the speed reducer and lubrication system. To provide proper lubrication a sufficient amount of lubricant must exist to assure that the level of lubricant will remain above the lowermost edge of pump element 34, see FIG. 4. In this position bearing 14 will be completely immersed and thus receive adequate lubrication. The rotation of pump element 34 will cause the lubricant to rise within the chamber, pass through the bores 50 and then be released to lubricate the bearings 12, 30, and the spline teeth 22, proper lubrication being provided in either mist form or as a liquid. The oil flows back through the bearing 30 and falls back to the outside of the reservoir 53. The oil returns to the reservoir through holes 55, of a predetermined size and number to assure that sufficient lubrication be pumped to the bearings.

When the shaft 6 is lowermost, a supply of oil must be provided which will reach the lips of pump element 36. The rotation of pump element 36 will impel the lubrication upwardly through the bores 52, through the elliptoid cam 28, up the vertical portions 40 of the pump element 34 before being released to the reservoir 53.

The reservoir and metering device 53 is provided to assure proper lubrication of the bearing 30 and to prevent this bearing from operating submerged in lubricant. The metering device 53, as can be seen in FIGS. 1 and 9, is an annular cup and comprises a substantially cylindrical outer portion 54, a tapered end member 56 having holes appropriately placed therethrough and a returning substantially cylindrical inner portion 58.

The shape and location of the metering device 53 enables it to catch the lubricant thrown upwardly by pump 36; collect, store and feed it to bearing 30 at a predetermined rate, thus allowing a larger quantity of lubricant to be present without submerging bearing 30. It will be obvious that the amount of lubricant supplied to bearing 30 will depend upon the size and number of the holes in the end member 56.

It will be understood that the particular machine embodying the invention is shown by way of illustration only and not as a limitation of the invention. The principles and features of this invention may be employed in varied and numerous embodiments without departing from the scope of the invention.

Having thus described our invention, what we claim as new and desire to secure by Letters Patent of the United States is:

1. An all-attitude lubrication system for mechanism within a sealed chamber comprising:
    (a) rotatable shaft within said chamber,
    (b) a centrifugal pump having two pump elements mounted upon said shaft to provide a generally upward flow of lubrication in a direction axially of said shaft when it is substantially vertical regardless of which end of the shaft is uppermost, the two pump elements being coaxially mounted in a back-to-back relationship, each of said pump elements having pumping portions in alignment with nonopposing portions of the other.

2. A lubrication system as in claim 1 wherein at least one of said pump elements is a fluted sleeve extending genearlly normally to a flat base and having some of the flutes tapering toward the axis of the sleeve as the distance from the base increases.

3. A lubrication system as in claim 1 wherein one of said pump elements has radially inwardly tapering lips extending out of the plane of a generally circular base member.

4. A lubrication system as in claim 1 including an annular cup-shaped lubricant metering device to store, meter, and uniformly distribute lubricant, coaxially mounted with said pump elements.

5. A lubrication system as in claim 4 wherein the metering device encircles one of the pump elements.

6. An all-attitude lubrication system for mechanism within a sealed chamber comprising:
    (a) a rotatable shaft within said chamber,
    (b) a centrifugal pump having two pump elements opposingly mounted on said shaft to provide a flow of lubricant in a direction axially of said shaft,
    (c) one of said pump elements comprising a base member and a fluted sleeve extending generally normal thereto, said sleeve having at least one of the flutes tapering toward the shaft as the distance from the base increases, and
    (d) the other of said pump elements having lips extending axially and tapering radially inwardly from a base member.

7. A lubrication system as in claim 6 wherein the pump elements are coaxially mounted in a back-to-back relationship, each of said pump elements having pumping portions in alignment with nonopposing portions of the other.

8. A lubrication system as in claim 6 wherein an annular cup-shaped lubricant metering and storing device is mounted on said shaft and encircles the sleeve of the first pump element.

References Cited

UNITED STATES PATENTS

| | | | |
|---|---|---|---|
| 1,220,810 | 3/1917 | Alquist | 74—467 X |
| 2,224,255 | 12/1940 | Delaval-Crow | 308—134.1 |
| 2,617,497 | 11/1952 | Zingg. | |
| 2,975,864 | 3/1961 | Stoffert | 184—6 |
| 3,049,285 | 8/1962 | Doeg. | |
| 3,243,243 | 3/1966 | Diver et al. | |

FOREIGN PATENTS

| | | |
|---|---|---|
| 177,998 | 11/1906 | Germany. |

LAVERNE D. GEIGER, *Primary Examiner.*

E. J. EARLS, *Assistant Examiner.*

U.S. Cl. X.R.

74—640; 103—3, 99; 308—134.1